United States Patent [19]

Kawasaki et al.

[11] Patent Number: 4,643,540
[45] Date of Patent: Feb. 17, 1987

[54] MICROSCOPE PROVIDED WITH AN AUTOMATICALLY CONTROLLED ILLUMINATING OPTICAL SYSTEM

[75] Inventors: Masami Kawasaki, Hachiouji; Masayuki Naito, Mitaka, both of Japan

[73] Assignee: Olympus Optical Co., Ltd., Tokyo, Japan

[21] Appl. No.: 591,379

[22] Filed: Mar. 20, 1984

[30] Foreign Application Priority Data

Mar. 22, 1983 [JP] Japan ................... 58-47649

[51] Int. Cl.$^4$ .................. G02B 21/00; G02B 21/36
[52] U.S. Cl. .................. 350/502; 350/507; 350/523; 350/526
[58] Field of Search ............ 350/507–508, 350/502, 520, 523–528; 354/79

[56] References Cited

U.S. PATENT DOCUMENTS

| | | | |
|---|---|---|---|
| 3,106,129 | 10/1963 | Frenk et al. ............ | 350/502 |
| 3,205,767 | 9/1965 | Weber et al. ............ | 354/79 |
| 3,619,035 | 11/1971 | Hopkins ............ | 350/184 |
| 3,679,287 | 7/1972 | Takahashi et al. ............ | 350/526 |
| 3,833,282 | 9/1974 | Kappl et al. ............ | 350/87 |
| 3,851,949 | 12/1974 | Kraft et al. ............ | 350/526 |
| 3,987,463 | 10/1976 | Nishikawa et al. ............ | 354/79 |
| 4,000,417 | 12/1976 | Adkisson et al. ............ | 250/201 |
| 4,093,991 | 6/1978 | Christie, Jr. et al. ............ | 364/525 |
| 4,163,150 | 7/1979 | Stankewitz ............ | 250/205 |
| 4,202,037 | 5/1980 | Glaser et al. ............ | 364/518 |
| 4,241,251 | 12/1980 | Yonekubo ............ | 250/205 |
| 4,384,200 | 5/1983 | Taira ............ | 350/526 |

FOREIGN PATENT DOCUMENTS

0088985A1 3/1983 European Pat. Off. .
55-44923 11/1980 Japan .
2052784 1/1981 United Kingdom ............ 350/527

OTHER PUBLICATIONS

Benedetti et al, "'Cytocon': A Micro-Processor–Scope", Conf: Proc. IFIP-IMIA (TC4) Working Conf., Rome, Italy (6-8 Feb. 1980), pp. 127-134.
Ruch et al, "A Microscope Fluorometer with Short-Time Excitation & Electronic Shutter Control", Functional Photography, Mar./Apr. 1981, pp. 14-16.
"The Happy Marriage of the Microscope and Electronics", Richard E. Stevens, Alexander Martens, Dec. 1976, Automation, pp. 42-45.

Primary Examiner—William H. Punter
Attorney, Agent, or Firm—Cushman, Darby & Cushman

[57] ABSTRACT

A microscope comprising a data input means capable of putting in data on the magnifications and kinds of objectives, a detecting means for recognizing an objective inserted in a light path, a memory means capable of memorizing respective data relating to a plurality of objectives, electric driving controlling means capable of adjusting the brightness of illuminating light brightness, field stop, aperture stop and condenser lens and a central processing unit capable of reading out of the memory means the data optimum to the objective recognized by the detecting means and adjusting the brightness of illuminating light, field stop, aperture stop and condenser lens through the respective driving controlling means so as to be optimum to the objective inserted in the light path, to make it possible to automatically and positively adjust the brightness of illuminating light, field stop, aperture stop and condenser lens so as to be optimum for the objective inserted in the light path.

6 Claims, 23 Drawing Figures

| REVOLVER POSITION | | 1 | 2 | 3 | 4 | 5 | 6 |
|---|---|---|---|---|---|---|---|
| OBJECTIVE | MAGNIFI-CATION | a | b | c | d | e | f |
| | KIND | A | B | C | D | E | F |

FIG. 6

| | OBJECTIVE | | | CONDENSER LENS | |
|---|---|---|---|---|---|
| | NA VALUE | | | | |
| KIND<br>MAGNIFICATION | SPLAN<br>APO | SPLAN | DPLAN | FOCAL<br>DISTANCE | FS<br>PROJECTION<br>MAGNIFICA-<br>TION |
| 1 x | —— | 0.04 | —— | 61.5 | 0.68 |
| 2 x | —— | 0.08 | —— | | |
| 4 x | 0.16 | 0.13 | 0.10 | | |
| 10 x | 0.40 | 0.30 | 0.25 | 12 | 0.133 |
| 20 x | 0.70 | 0.46 | 0.40 | | |
| 40 x | 0.95 | 0.70 | 0.65 | 6.5 | 0.0722 |
| 100 x | 1.40 | 1.25 | 1.25 | | |

FIG. 7

| LIGHT PATH | F No. (VISUAL FIELD NUMBER) |
|---|---|
| Bi | 28 |
| FK 2.5 x | 24 |
| 3.3 x | 18 |
| 4 x | 15 |
| 5 x | 12.3 |

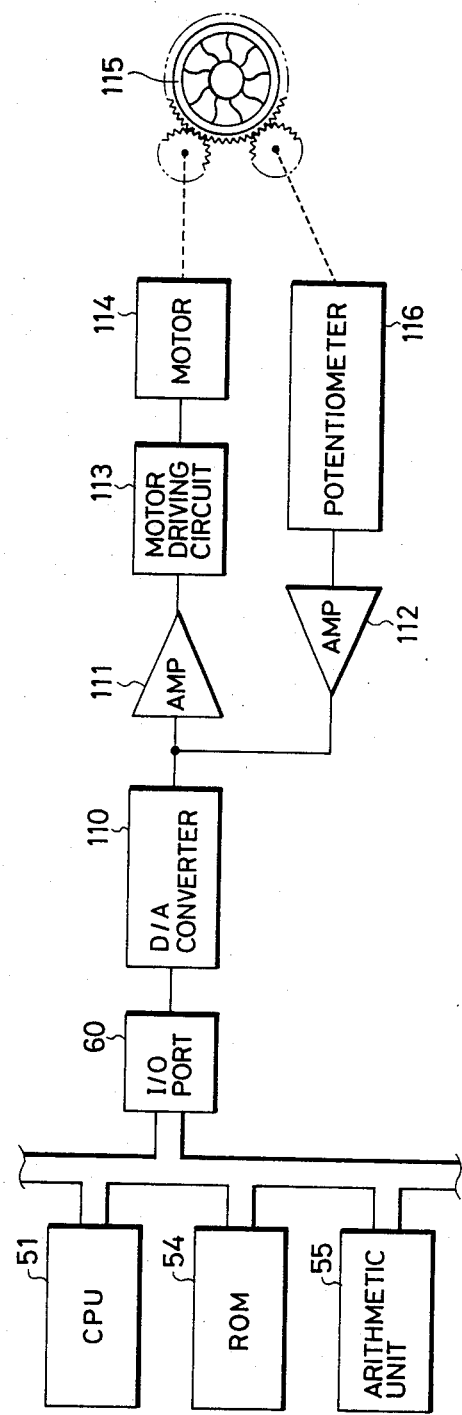

FIG. 10

| LIGHT AMOUNT RATIO | ND 0 (1/2 FILTER) | ND 1 (1/4 FILTER) | ND 2 (1/8 FILTER) | ND 3 (1/16 FILTER) |
|---|---|---|---|---|
| 1 | | | | |
| 1/2 | ○ | | | |
| 1/4 | | ○ | | |
| 1/8 | ○ | ○ | | |
| 1/16 | ○ | | ○ | |
| 1/32 | ○ | | | ○ |
| 1/64 | ○ | ○ | ○ | |
| 1/128 | ○ | ○ | | ○ |
| 1/256 | ○ | | ○ | ○ |
| 1/512 | | ○ | ○ | ○ |
| 1/1024 | ○ | ○ | ○ | ○ |

○ : INSERTED

FIG. 11

| LIGHT PATH | Bi | $\log_a Bi$ |
|---|---|---|
| Bi 100 % | 1 | 0 |
| Bi 20 % | 0.2 | -9 |
| FK 2.5 x | 0.148 | -11 |
| 3.3 x | 0.0847 | -14 |
| 4 x | 0.0589 | -16 |
| 5 x | 0.0371 | -19 |

FIG. 12

| MAGNIFI-CATION | $\log_a Ob$ | | |
|---|---|---|---|
| | SPLAN APO | SPLAN | DPLAN |
| 1 x | — | 3 | — |
| 2 | — | 3 | — |
| 4 | 2 | 0 | -2 |
| 10 | 2 | 0 | -3 |
| 20 | -1 | -4 | -6 |
| 40 | -5 | -7 | -8 |
| 100 | -15 | -15 | -15 |

FIG. 13

| ND | $\log_a$ ND | | |
|---|---|---|---|
| 1 | $\geq \log_a$ ND | | $> -2$ |
| 1/2 | $-2 \geq$ | ⁄⁄ | $> -6$ |
| 1/4 | $-6 \geq$ | ⁄⁄ | $> -10$ |
| 1/8 | $-10 \geq$ | ⁄⁄ | $> -14$ |
| 1/16 | $-14 \geq$ | ⁄⁄ | $> -18$ |
| 1/32 | $-18 \geq$ | ⁄⁄ | $> -22$ |
| 1/64 | $-22 \geq$ | ⁄⁄ | $> -26$ |
| 1/128 | $-26 \geq$ | ⁄⁄ | $> -30$ |
| 1/256 | $-30 \geq$ | ⁄⁄ | $> -34$ |
| 1/512 | $-34 \geq$ | ⁄⁄ | $> -38$ |
| 1/1024 | $-38 \geq$ | ⁄⁄ | |

MICROSCOPE PROVIDED WITH AN AUTOMATICALLY CONTROLLED ILLUMINATING OPTICAL SYSTEM

BACKGROUND OF THE INVENTION (a) Field of the Invention

This invention relates to microscopes and more particularly to a microscope provided with an automatically controlled illuminating optical system.

(b) Description of the Prior Art

Generally, the greatest factor for determining the optical performance of a microscope is the optical performance of objectives themselves. However, unless the illuminating light incident upon the objective is proper, the perfomance of the objective will not be able to be well utilized. Therefore, in the case of a high performance microscope, it will be necessary to properly correct the illuminating light with the change of the objective by switching over the condenser lens of the illuminating optical system and adjusting the aperture stop and field stop. In such case, as the conditions on the visual field and numerical aperture must be met, in order to make a proper illumination of from a very low magnification to a high magnification, the switching over of the condenser lens will be made by a stepwise switching or zoom type switching. When the aperture stop is opened to be too large, the contrast of the object image will reduce but, when it is stopped down to be too small, the resolving power will reduce. However, it is generally considered to be the best to stop down the aperture stop to be a little smaller than the pupil of the objective. At the time of photographing, if it is stopped down to be a little smaller than at the time of observation, a better result will be obtained. Further, if the field stop is stopped down to be smaller, the contrast of the center will improve. Therefore, it is stopped down as much as possible to be so small as not to cut the visual field. The brightness of the visual field will vary so greatly depending on the magnification of the objective to be used and the illuminating optical system that the light must be adjusted by the adjustment of the light source voltage and the insertion of an ND-filter. Thus, in order to make display the performance of the microscope to be used, such complicated and difficult operations as are mentioned will be required whenever the objective is changed. By the way, as a prior art, there is such microscope illuminating device as is disclosed in Japanese Patent Publication No. 44923/1980. This is only to operatively connect the change of the illuminating lens system with the change of the objective and little contributes to the simplification of the entire microscope.

SUMMARY OF THE INVENTION

Inview of the above mentioned circumstances, a primary object of the present invention is to provide a microscope wherein the adjustment of the brightness of illuminating light, field stop and aperture stop and the switching over of the condenser lens with the change of the objective are automated so as to be able to simplify the entire operation and prevent operation mistakes.

According to the present invention, this object can be attained by providing an objective data input means for putting in the magnifications and kinds of objectives, a first memory means for storing the objective data put in by the input means, a first detecting means for recognizing the objective inserted into a light path through a revolver, a plurality of first driving means capable of respectively driving a light adjusting device, field stop, aperture stop and condenser lens unit and a first electric controlling means capable of controlling the operations of these driving means. The data relating to the objective inserted in the light path are read out of the first memory means by an output signal from the first detecting means and the brightness of the illuminating light to be adjusted by the light adjusting device, diameter of the field stop, diameter of the aperture stop and condenser lens to be inserted into the light path are automatically set so as to be optimum for the objective inserted in the light path through the first electric controlling means and first driving means on the basis of the data thus read out.

According to a preferred formation of the present invention, there is provided a second detecting means for detecting which of the photographing light path, photographing lens, observing light path is selected to be used and the light adjusting device and field stop are automatically controlled so as to obtain the brightness of illuminating light and diameter of the field stop optimum to the light path selected to be used through the first memory means, first electric controlling means and first driving means. Thus, the simplification of the operation can be attained.

According to another preferred formation of the present invention, there are provided a light adjusting device for correcting the brightness of an illuminating light, diameter of a field stop and diameter of an aperture stop, an operating means capable of manually operating the field stop and aperture stop, a second memory means capable of storing correction coefficients for the brightness of illuminating light, diameter of the field stop and diameter of the aperture stop to be given by the manual operation of this operating means and a correcting controlling means capable of correcting the brightness, field stop diameter and aperture stop diameter obtained automatically through the first electric controlling means and first driving means on the basis of the above mentioned correction coefficients to keep constant the correction ratio by the manual operation even when the objective and/or light path is switched over. Thereby, the uniformity of the adjustment by the automation can be eliminated and an observed image adapted to the state of the sample and the liking of the observer can be obtained.

According to a further preferred formation of the present invention, there are provided a second driving means capable of rotating a revolver to switch over an objective to be inserted into a light path, a second electric controlling means capable of controlling the operation of the second driving means and an operating means capable of operating the second driving means through the second electric controlling means. The first and second electric controlling means are so related with each other that the brightness of illuminating light, field stop diameter, aperture stop diameter and condenser lens will be automatically set completely while the objective is being switched over.

According to the present invention, when the data of the objective is put into the first memory means by the input means, the value of the brightness, value of the field stop diameter, value of the aperture stop diameter and kind of the condenser lens optimum to each objective will be stored in the first memory means, the brightness of illuminating light, field stop diameter and aperture stop diameter will be automatically set at initial values (representative values) through the first electric controlling means and first driving means and the standard condenser lens will be automatically inserted into the light path. Thereby, the operation in case recorrection is made will be easy.

This and other objects of the present invention will become more apparent during the course of the following detailed description and appended claims.

BRIEF DESCRIPTION OF THE DRAWINGS

FIG. 6 is a table showing combinations of an objective and condenser lens;

FIG. 7 is a table showing F Nos. (field numbers) of light paths;

FIG. 8 is a block diagram of a stop controlling system;

FIG. 10 is a table showing light amount ratios by combinations of ND-filters;

FIG. 11 is a table showing light amount ratios by light paths;

FIG. 12 is a table showing light amount ratios by objectives;

FIG. 13 is a table showing light amount ratios by the ND-filters;

FIG. 21 is a flow chart showing an operation sequence when a revolver starting switch is put in.

DESCRIPTION OF THE PREFERRED EMBODIMENT

Figure 1:
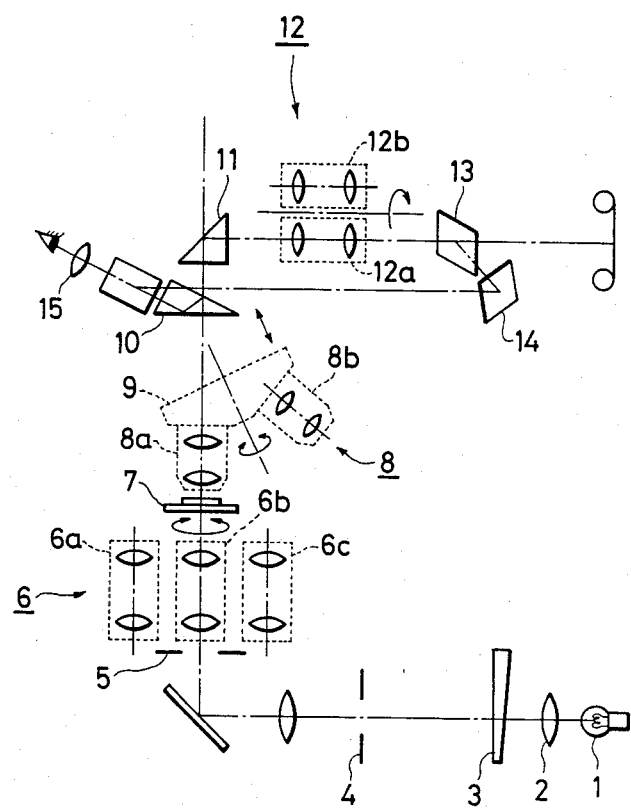
FIG. 1 is a schematic view showing an example of the basic formation of the optical system of a microscope.

Referring to FIG. 1, the reference numeral 1 denotes such light source as, for example, a halogen lamp, 2 denotes a collector lens, 3 denotes an ND-filter for adjusting a light without changing the color temperature of the light source 1, 4 denotes a field stop, 5 denotes an aperture stop, 6 denotes a condenser lens unit consisting of a plurality of condenser lenses 6a, 6b and 6c which can be selectively inserted into a light path, 7 denotes a stage and 8 denotes an objective unit consisting of objectives 8a and 8b attached to a revolver 9.

Figure 2:
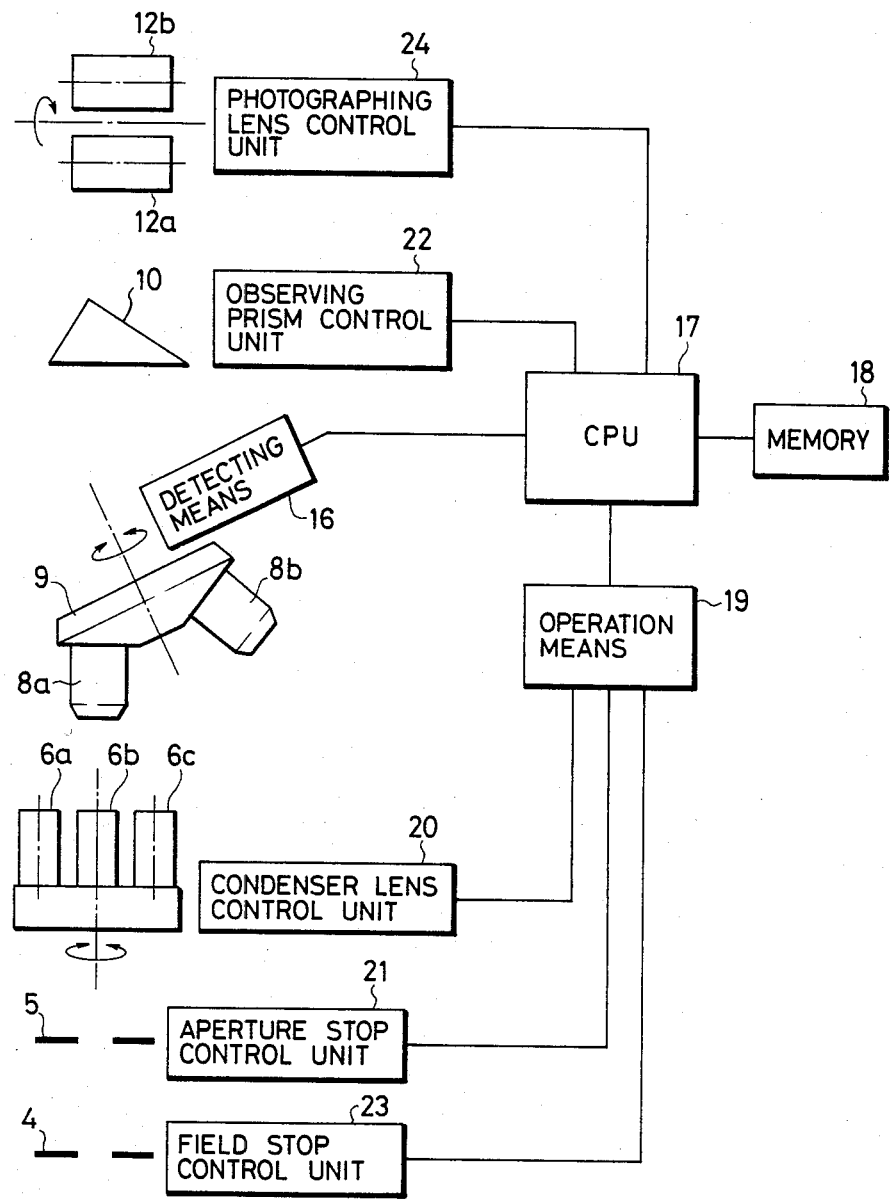
FIG. 2 is a block diagram of a controlling system according to the present invention for the microscope shown in FIG. 1.

Here, the condenser lenses 6a, 6b and 6c are selected by the magnifications of the objectives 8a and 8b and the stop diameters of the field stop 4 and aperture stop 5 are adjusted on the basis of the objective and condenser lens inserted in the light path. The reference numeral 10 denotes an observing prism arranged movably in the direction indicated by the arrow so that, when the prism 10 is inserted in the light path as illustrated, observation will be able to be made through an eyepiece 15 and, when it is retreated from the light path, observation will be made through a reflecting prism 11, photographing lens 12a or 12b, half mirror 13 and reflecting mirror 14 and again through the eyepiece 15 and, at the same time, photographing will be made. The reference numeral 12 denotes a photographing lens unit consisting of a plurality of photographing lenses 12a and 12b selectively insertable into the light path. Now, referring to FIG. 2, the reference numeral 16 denotes a detecting means used to read out the data of the objective inserted in the light path by detecting the hole position of the revolver 9 or directly reading out the indication outside the objectives 8a and 8b. The objective data can include not only magnification but also numerical aperture in case the objective, for example, of the same magnification but a different numerical aperture is used (in such case that there are achromatic and apochromatic lens). The reference numeral 17 denotes a CPU, 18 denotes a memory unit, 19 denotes an arithmetic unit, 20 denotes a condenser lens controlling unit including a driving means, 21 denotes an aperture stop controlling unit including a driving means, 22 denotes an observing prism controlling unit including a driving means, 23 denotes a field stop controlling unit including a driving means and 24 denotes a photographing lens controlling unit including a driving means.

The operation of the microscope having the thus formed optical system and driving controlling system shall be explained in the following. First of all the data of the objective 8a inserted in the light path will be read out by the detecting means 16 and the data signal will be put into the CPU 17. In the CPU 17, the magnification and numerical aperture of the objective stored therein in advance will be read out of the memory unit 18 by the data signal put in and will be put into the arithmetic unit 19 wherein the signals to be put out to the respective controlling units 20, 21, 22, 23 and 24 will be operated. For example, in switching over the illumination magnification, which of the condenser lenses 6a, 6b and 6c shoud be inserted will be determined by the magnification of the objective inserted in the light path, a signal will be put out to the condenser lens controlling unit 20 and the selected optimum condenser lens will be inserted into the light path. The size of the aperture stop 21 (aperture stop diameter) is a function of the numerical aperture of the objective and focal distance of the condenser lens and will be therefore calculated by the arithmetic unit 19, a signal will be put out to the aperture stop controlling unit 21 and the aperture stop diameter will be adjusted to be of an optimum value. However, the coefficient of stopping down is generally considered to be proper at 70 to 80% of the pupil of the objective and, at the time of photographing, when the aperture stop is a little more stopped down than at the time of observation, a better image will be obtained. Therefore, when a signal as to whether the light path is formed to observe or to photograph is put into the CPU 17 from the observing prism controlling unit 22, the coefficient of stopping down will be able to be corrected. The size of the field stop 4 (field stop diameter) is a function of the magnification of the objective and the projection magnification of the stop image by calculated by the arithmetic unit 19, a signal will be put out to the field stop controlling unit 23 and the field stop diameter will be adjusted to be of an optimum value. In the case of observation, by sensing that the observing prism 10 is inserted in the light path, that is to say, on the basis of the signal from the observing prism controlling unit 22, the field stop diameter will be adjusted to be of a size substantially in external contact with the visual field of the eyepiece 15. In the case of photographing, when the magnification of the photographing lens inserted in the light path is sensed by the photographing lens controlling unit 24 and a signal is put into the CPU 17, the field stop 4 will be adjusted to be of a size substantially in external contact with the visual field of the photographing lens inserted in the light path. By the way, the ND-filter 3 will be controlled on the basis of the output signal from the arithmetic unit 19 by a known method. Further, the coefficients of stopping down of the aperture stop 5 and field stop 4 had better be changed in response to the state of the sample in some case and therefore a manual operation is made possible. In such case, if the size of the stop is changed, the coefficient of stopping down then will be stored in the memory means 18 and, even in the case of changing the magnification of the objective, the size of the stop will be able to be adjusted of the basis of the same coefficient of stopping down. Further, a manual operation is made possible so that even the brightness can be changed in response to the liking of the observer and the state of the sample. Thus the operation of the driving controlling system will be completed. If these operations are made after the end of the magnification change of the objective, the brightness of the illuminating light and the transition state of the image will be an unpleasant feeling to the observer. Therefore, the switching over of the condenser lens, adjustment of the stop and driving of the ND-filter will be perfectly carried out during the rotation of the revolver 9.

The above is the outline of the formation and operation of the microscope according to the present invention. An embodiment of the system according to the present invention shall be more particularly explained in the following.

Figure 3:
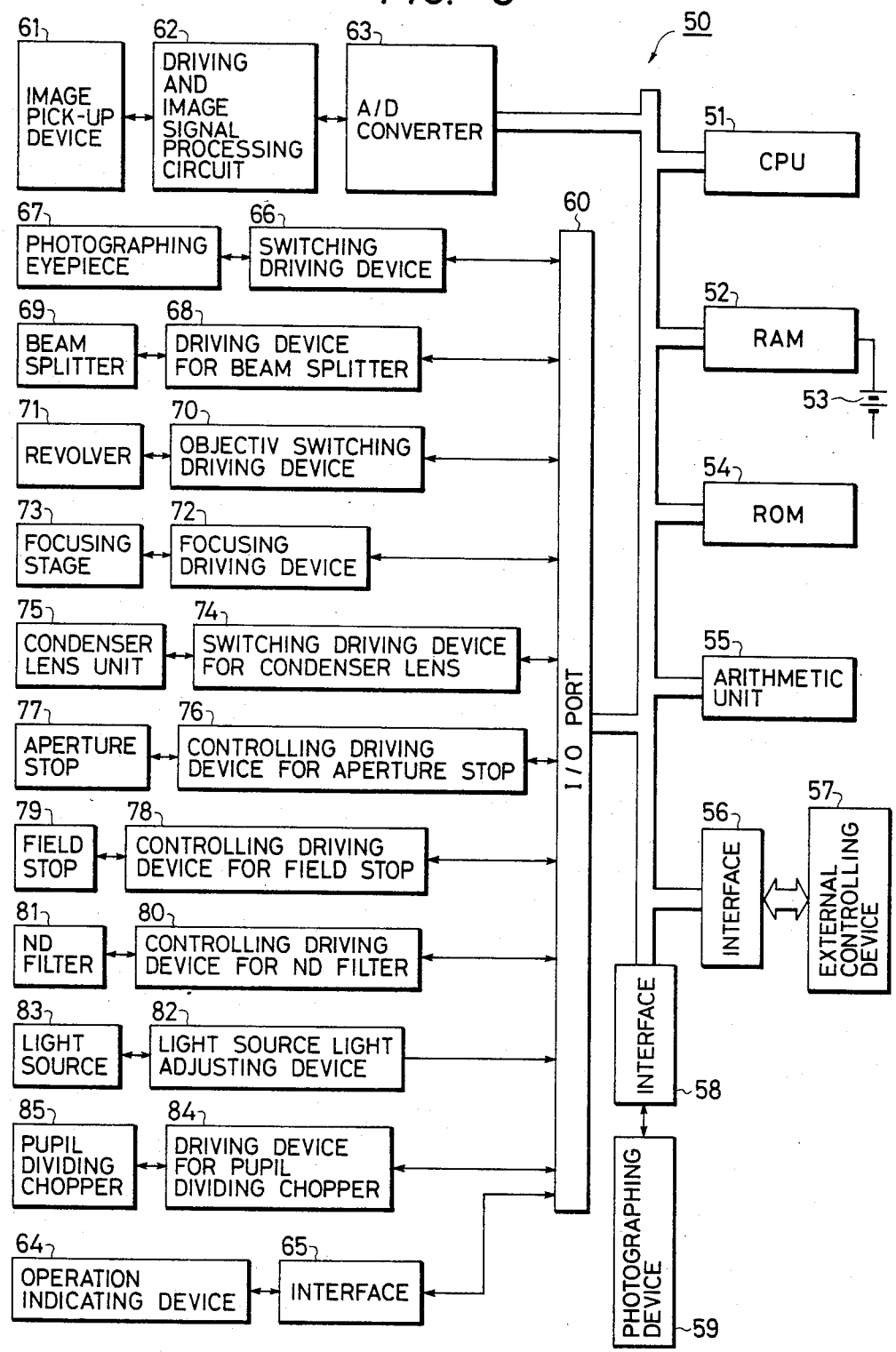
FIG. 3 is a detailed block diagram showing an embodiment of the controlling device of the microscope according to the present invention.
Figures 4, 5:
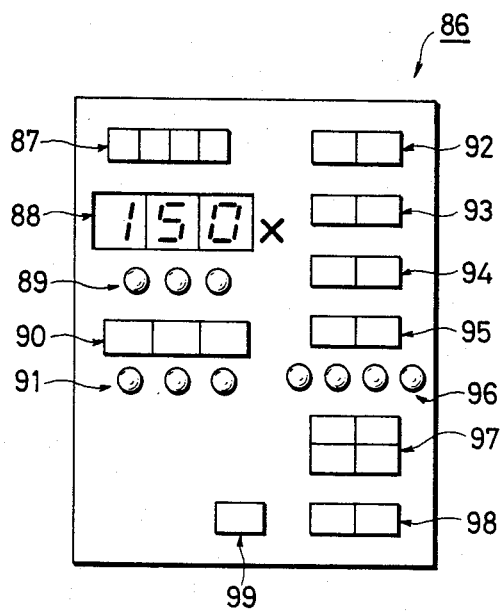
FIG. 4 is an elevation showing an example of an operating panel in the controlling device in FIG. 3.
FIG. 5 is a table showing an objective data table.

In FIG. 3 showing a microscope controlling device 50 according to the present invention, the reference numeral 51 denotes a CPU, 52 denotes a RAM backed up by a battery 53 when the electric source is interrupted, 54 denotes a ROM as a program memory, 55 denotes an arithmetic unit used to improve the precision of the operation and to reduce the operation time, 56 denotes an interface for an external controlling device 57 used to control the controlling device 50 from outside, 58 denotes an interface for a photographing device 59, 60 denotes an I/O port for receiving and delivering the data and signals between later described various switching and controlling driving devices and the CPU 51, 61 denotes an image pickup device made by arranging in a row many image sensors for automatic focusing, 62 denotes a driving and image signal processing circuit for the image pickup device 61, 63 denotes an A/D converter, 64 denotes an operation indicating device including an operating switch button and indicator and used to put the input and output signals of the data relating to the objectives 8a and 8b and the switching signals to the respective driving devices and the like into and out of the I/O port 60 through the interface 65, 66 denotes a driving device for switching the photographing eyepiece 67, and 68 denotes a driving device for a beam splitter 69 capable of switching the light path to the observing system and photographing system and it can simultaneously detect which of the light paths is selected to use and put out the detecting signal to the CPU 51. The reference numeral 70 denotes an objective switching driving device used to bring any of the objectives 8a and 8b into the light path by rotating a revolver 71 and it can simultaneously detect the position of the revolver 71, that is, which of the objectives is inserted in the light path. The reference numeral 72 denotes a focusing driving device used for focusing by vertically moving a focusing stage 73, 74 denotes a switching driving device for switching a condenser lens unit 75 in response to the magnification of the objective inserted in the light path, 76 denotes a controlling driving device for controlling the stop diameter of an aperture stop 77, 78 denotes a controlling driving device for controlling the stop diameter of a field stop 79, 80 denotes an ND-filter switching driving device for adjusting the passing light amount ratio by switching an ND-filter unit 81 used to adjust the light, 82 denotes a light source light adjusting device for adjusting the light of a light source 83 and 84 denotes a driving device for a pupil dividing chopper 85 used for automatic focusing. In FIG. 4 showing an example of the operation indicating device 64, the reference numeral 86 denotes an operating panel, 87 denotes a switch button for putting in the magnifications and kinds (such as SPLAN, SPLAN APO and DPLAN) of the respective objectives 8a and 8b, 88 denotes a magnification indicator for the objective inserted in the light path (or selected to be used), 89 denotes a kind indicator for the objective inserted in the light path, 90 denotes a switch button for switching the light path to the observing system or the photographing optical system, 91 denotes an indicator for showing the kind of the light path switched to the using state, 92 and 93 denote switching buttons for manually adjusting respectively the field stop 79 and aperture stop 77 to be of proper stop diameters, 94 denotes a switch button for adjusting the light, 95 denotes a switch button for switching the magnification of the photographing eyepiece 67. 96 denotes an indicator for indicating the magnification of the photographing eyepiece inserted in the light path, 97 denotes a switch button for driving the stage 73 through the focusing driving device 72, 98 denotes a starting switch button for rotating the revolver 71, and 99 denotes a starting switch button for starting the automatic focusing operation.

The operation of the above mentioned device shall be explained in the following. First of all, setting the data of the objectives and the action relating to it shall be explained.

Now, the case that the objective SPLAN of 10x is inserted in the light path by rotating the revolver 71 by the operation of the starting switch button 78 or by directly rotating the revolver 71 by hand shall be explained as an example. When the button designating a magnification of 10x and the kind SPLAN among the switch buttons 87 is pushed on the operating panel 86, this information will be put into the CPU 51 through the interface 65 and I/O port 60. On the other hand, by the CPU 51, the position of the revolver will be read out of the objective switching driving device 70, a data table 100 (FIG. 5) on the objective SPLAN of 10x will be made of the position and the information put in from the operating panel 86 and will be memorized by the RAM 52. This data table 100 will contain the position data of the revolver 71 and the data of the magnification and kind of the objective corresponding to them. In the case of FIG. 5, the data table 100 containing six revolver position data and the data of the magnifications and kinds of the respective objectives corresponding to them will be made. By the CPU 51, the following operation and control will be performed by always monitoring this data table 100. That is to say, by the CPU 51, the magnification of the condenser lens 75 adapted to the objective inserted in the light path will be determined from the table in FIG. 6 in which combinations are theoretically determined in advance with reference to the table 100, a switching signal will be put out to the condenser lens switching driving device 74 and switching to a proper condenser lens will be performed. In the embodiment, the condenser lens 75 can be switched in three steps in response to the magnification of the objective. Then, in order to further set the observing condition, the stop diameters of the field stop 79 and aperture stop 77 will be respectively determined as mentioned below according to the data table 100. First of all, how to determine the stop diameter of the field stop 79 shall be explained. The stop diameter $d_1$ of the field stop 79 is calculated on the basis of the following formula:

$$d_1 = \frac{\text{FNo (Field number)}}{\text{Objective magnification} \times \text{FS projection magnification}} \times K1 \quad (1)$$

wherein FNo. (Field number) is determined by whether the light path is switched to the observing system (Bi) or is switched to the photographing system (FK) as shown in the table in FIG. 7 or will be further determined by the magnification of the photographing eyepiece 67 when the light path is switched to the photographing system, also the FS projection magnification is determined by the magnification of the condenser lens 75 as shown in the table in FIG. 6, K1 is a ratio to the visual field, if K1=1, the value calculated by the formula (1) will give the stop aperture in external contact with the visual field, in this embodiment, when the data of the objective are set and when the electric source is put in the stop diameter $d_1$ of the field stop 79 will be determined with K1=1 and therefore, even if the light path is switched to the observing system or to the photographing system, the field stop will be always set by the formula (1) so as to be a stop aperture in external contact with the visual field. Now, the stop diameter $d_2$ of the aperture stop 77 is calculated by the following formula:

$$d_2 = NA \times 2 \times f \times K2 \quad (2)$$

wherein NA is a value determined by the magnification and kind of the objective as shown in the table in FIG. 6, f is a focal distance of the condenser lens 75 determined likewise from the table in FIG. 6, K2 is a ratio to the pupil diameter, if K2=1, the value $d_2$ obtained from the formula (2) will give the same stop diameter as the pupil diameter, in this embodiment, when the data of the objective are set and when the electric source is put in, with K2=0.8, the stop diameter $d_2$ of the aperture stop 77 will be initially set to be of a size 80% pupil diameter of the eyepiece so as to be optimum at the time of observation. By the way, the tables in FIGS. 6 and 7 are memorized in advance in the ROM 54. Here, in case the objective is the SPLAN of 10x and the light path is switched to the observing system, the respective stop diameters $d_1$ and $d_2$ to be automatically set will be calculated as follows. FNo.=28 and FS projection magnification=0.133 will be obtained from the tables in FIGS. 6 and 7, if K1=1, from the formula (1)

$$d_1 = \frac{28}{10 \times 0.133} \times 1 \approx 21.1 \text{ (mm)},$$

in the same manner, from the table in FIG. 6, NA=0.3 and f=12 will be obtained and, if K2=0.8, from the formula (2), $$d_2 = 0.3 \times 2 \times 12 \times 0.8 \approx 5.8 \text{ (mm)}$$

will be obtained. The above calculation is performed by the CPU 51 and arithmetic unit 55. By the calculation result, the field stop 79 and aperture stop 77 are set to be stops having the above mentioned stop diameters $d_1$ and $d_2$ through the field stop controlling driving device 78 and aperture stop controlling driving device 76. In FIG. 8 showing an example of a controlling driving device for the field stop 79 or aperture stop 77, the reference numeral 110 denote a D/A converter, 111 and 112 denote amplifiers, 113 denotes a motor driving circuit, 114 denotes a motor, 115 denotes a stop mechanism capable of being opened and closed by the motor 114 through gears and 116 denotes a potentiometer for detecting the operating position of the stop mechanism 115. Here, in the case of the digital conversion of 8 bits, if the adjustable range of the stop diameter calculated as described above is 0 to 34 mm, $$D/A \text{ data} = \text{Field stop diameter} \times 7.5 \quad (3)$$

$$\therefore D/A \text{ data} = \frac{\text{FNo. (Field number)}}{\text{objective magnification} \times \text{FS projection magnification}} \times K1 \times 7.5$$

therefore, the resolving power will be 0.13 mm/bit, the data digital-converted to 8 bits will be put into the D/A converter 110 through the I/O port 60 from the CPU 51, will be here converted to an analogue signal, will be amplified by the amplifier 111 and will drive the motor 114 through the motor driving circuit 113, therefore the stop mechanism 115 will be operated and the stop diameter will be adjusted but, as its operating position is always monitored by the potentiometer 116 and is fed back to the amplifier 111 through the amplifier 112, the stop aperture will be able to be controlled to be of a predetermined stop diameter.

Now, the automatic setting operation to make the optimum brightness for the observation when the objective data are set shall be explained in the following.

Figure 9A:
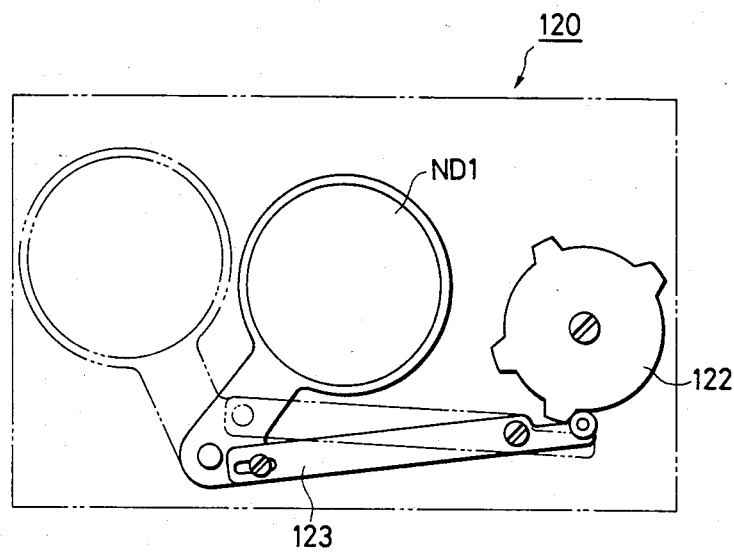
FIGS. 9A and 9B are respective plan and side views showing and example of an ND-filter unit.
Figure 9B:
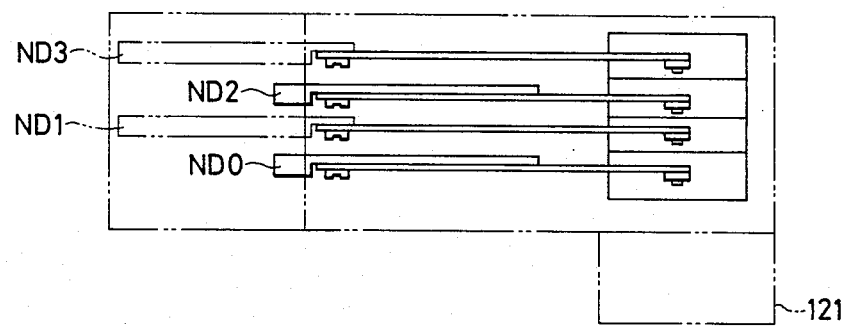

The illumination L on the image surface of the observing light is represented as follows:

$$L = LA \times ND \times AS \times Ob \times Bi \text{ (lx)} \quad (4)$$

wherein ND is a light amount ratio given by the ND-filter unit 120 capable of changing the transmission factor by the combination of a plurality (here 4) of ND-filters ND0, ND1, ND2 and ND3 as shown, for example, in FIGS. 9A and 9B and will be controlled in 11 steps as shown in FIG. 10 when each ND-filter is selectively inserted into the light path through a lever 123 by a cam 122 driven by the motor 121, in FIGS. 9A and 9B, the ND0 and ND2 are inserted in the light path, from FIG.

10, the light amount ratio ND=1/16 is given, AS is a brightness ratio of the aperture stop 77 and will be $0.8^2=0.64$ when the standard value is 80% pupil diameter, Bi is a light amount ratio when the light path of 100% Bi is made 1 as shown in FIG. 11, Ob is a light amount ratio with reference to the magnification and kind of the objective as shown in FIG. 12 and the light amount ratio Ob of the objective SPLAN of 10x is made 1 as a standard. LA is an illumination of the image surface in the light path of the objective SPLAN of 10x, light amount ratio ND=1, brightness ratio AS=1 and 100% Bi and, in this embodiment, LA=189 lx is predetermined to be used as a constant. In this state, in order to always maintain the illumination of the image surface within the range of 0.5 to 1 lx, by the target value of $L=0.5\times\sqrt{2}\times 2\pm\frac{1}{2}=0.707\times 2\pm\frac{1}{2}$(lx), from the formula (4), $$L = 189 \times 0.64 \times ND \times Ob \times Bi \quad (5)$$
$$= 0.707 \times 2^{\pm\frac{1}{2}},$$

therefore;

$$ND = \frac{0.707}{189 \times 0.64 \times Ob \times Bi} = \frac{5.84 \times 10^{-3}}{Ob \times Bi}$$

is obtained and the target value of the light amount ratio of the ND-filter is given. Now, as the ND-filter unit 120 is formed of a combination of four ND-filters, the target value of ND by the formula (5) must be given by the resolving power of $2^{\frac{1}{4}}$. Therefore, if a logarithm having $2^{\frac{1}{4}}$ at the bottom is taken in the formula (5), $$\log_a ND = -30 - \log_a OB - \log_a Bi \quad (6)$$

will be made. Therefore, in order to determine an actual combination of ND-filters, $\log_a Ob$ is determined in response to the objective from the table in FIG. 12, also $\log_a Bi$ is determined from the table in FIG. 11 and $\log_a ND$ is obtained from the formula (5). Thus, the light amount ratio ND is obtained on the basis of the table shown in FIG. 13 in response to this $\log_a ND$ and such ND-filter as gives this light amount ratio is controlled by the ND-filter switching driving device 80 according to FIG. 10. By the way, the tables in FIGS. 10 to 13 are memorized in advance in the ROM 54 as data to be read out according to the need. Here, in the case of a light path of the objective SPLAN of 10x and observing system of 20% Bi, from the tables in FIGS. 11 and 12, $\log_a Bi = -9$ and $\log_a Ob = 0$ will be obtained from the formula (6), $$\log_a ND = -30 - 0 - (-9) = -21$$

will be obtained, from the table in FIG. 13, ND=1/32 will be obtained and, according to the table in FIG. 10, if the ND-filters ND0 and ND3 are inserted into the light path, a proper brightness will be obtained. Therefore, when the CPU 51 puts out a signal to the ND-filter switching driving device 80 to insert the ND-filters ND0 and ND3 into the light path, the brightness of the observing system will be able to be set at a predetermined optimum value.

Thus, there are performed a series of related operations at the time of setting the data of the objective. In the case of setting the data of a plurality of objectives, the above mentioned operation will be effected on each objective. Also, the once set data of the objectives will be memorized in the RAM 52 together with the positions of the revolver 71 as the data table 100 in FIG. 5 and, as the RAM 52 is backed up by the battery 53 even when the electric source is interrupted, the data may be set only once at first. Further, as the data table 100 is memorized in the RAM 52, for example, if the revolver 71 is switched, the revolver position will be detected by the switching driving device 70, the magnification and kind of the objective will be read out by the data table 100 and, by the CPU 51, an optimum combination of the condenser lens 75, stop diameters of the field stop 79 and aperture stop 77 and ND-filter unit 81 will be automatically determined by operating as described above or referring to the data of the table memorized in the ROM 54 and signals will be put out to the respective driving devices to automatically set the elements of the illuminating optical system. By the way, not only at the time of switching the objective but also in the case of switching the light path of the observing system (Bi) and switching the photographing eyepiece 67, the above mentioned automatic setting will be performed exactly the same and therefore the observer will be released from the complicated operation of the microscope and will be able to make detection without any operation mistake.

Figure 14:
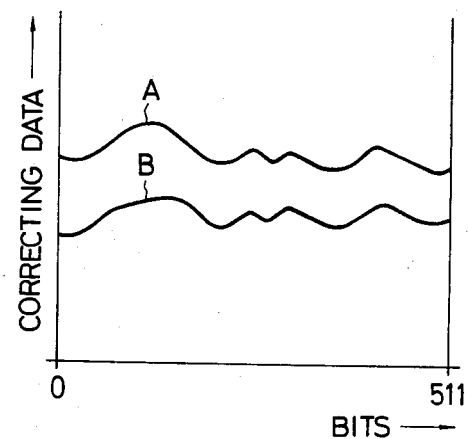
FIGS. 14 and 15 are graphs showing respectively correcting data and correction coefficients.
Figure 15:
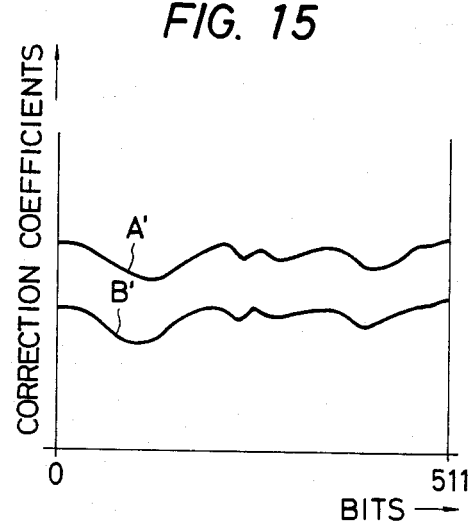

After the data are set and the related operations are performed as in the above, background data of the optical system for automatic focusing will be put in to correct the unevenness of the illumination of the image projected onto the image pickup device 61, the irregularity of the optical system and the noise pattern existing naturally in the image pickup device 61 under the state in which no sample is placed on the focusing stage 73. Further, in the input sequence of this correcting data, the data of the ND-filter unit 81, field stop 79 and aperture stop 77 will be so set as to be put in as optimum projected image data by the data table 100 memorized in the RAM 52. The two projected image data A and B divided by the pupil dividing chopper 85 will be obtained as in FIG. 14 by the image pickup device 61 and will be used as correcting data. Here, the x-axis represents bits of the image pickup device 61 and the y-axis represents output signals, that is, light amounts of the respective bits. When the correction coefficients of the respective bits are determined on the basis of these data, the correction coefficients A' and B' for the correcting data A and B will be respectively represented as in FIG. 15. When the correction coefficients A' and B' are put into the RAM 52 and are compared with the data table 100, the correction coefficients on the respective objectives will be memorized in turn in the RAM 52. In the case of automatic focusing, when image data are put in the CPU 51 from the image pickup device 61, the image data will be calculated with the correction coefficients to improve the precision of the image data. After this correcting data input sequence, the ND-filter 81, field stop 79 and aperture stop 77 will be set at the above described values so determined as to respectively show the best conditions for the observation.

Figure 16:
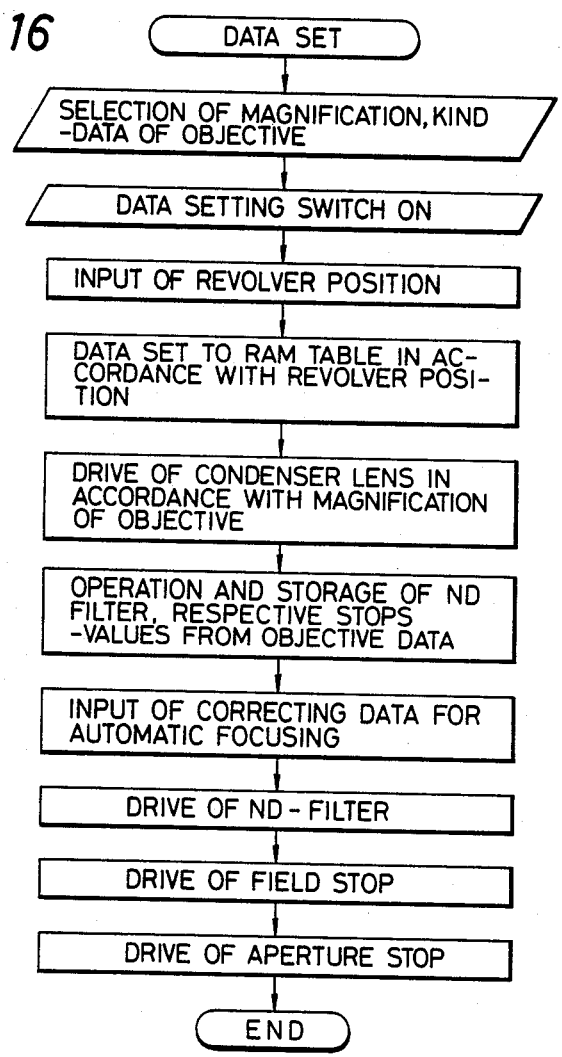
FIG. 16 is a flow chart showing procedures of the automatic control according to the present invention.

The objective data are set and the operations relating to them are performed as in the above. Summarizing them is as shown in the flow chart in FIG. 16.

Now, the case that the stop and brightness are optionally set with the manual operation by the observer shall be explained in the following.

As described above, at the time of setting the objective data and putting in the electric source, the field stop, aperture stop and ND-filter for setting the brightness will be set at the initial values (representative values). In such case, respectively the field stop 79 will be set to be in external contact with the visual field with K1=1 in the formula (1), the aperture stop 77 will be set to be of 80% on the pupil diameter with K2=0.8 in the formula (2) and the ND-filter will be set to be of a brightness of 0.5 to lx on the image surface with the constant of −30 in the formula (6). After the initial values are thus set, the manual operation will be made.

Figure 17:
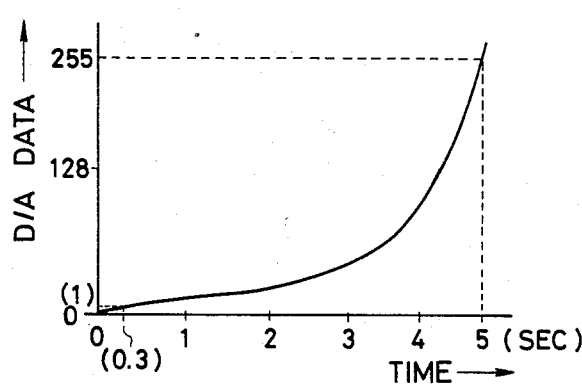
FIG. 17 is a graph showing the output of a switch in the case of the manual operation.

First of all, the correction sequence with the manual operation of the field stop 79 shall be explained. When a signal is put in by the switch button 92 on the operation panel 86 in FIG. 4, the signal will be sent to the CPU 51 through the interface 65 and I/O port 60 from the operation panel 64 in FIG. 3. The CPU 51 will put out digital data to the D/A converter 110 (FIG. 8) through the I/O port 60 while controlling the time while monitoring whether the switch button 92 keeps on being pushed. FIG. 17 shows relations between the on-time of the switch button 92 and output of the D/A data. When the D/A data are varied with the time as exponential functions, for several seconds with the switch button switched, on the control will be made possible at a low speed and, when the on-time further lapses, the control will be made corresponding to the human operating sense so that the stop will be able to be quickly opened and closed. In this embodiment, the time required to make the stop of the maximum stop diameter from the minumum stop diameter is set to be about 5 seconds and the changing rate of the stop diameter just after the switch button 92 is on is set at 1 step/0.3 second. Here, how to determine the correction coefficient by the manual operation shall be explained. When the switch button 92 is pushed;

(1) The D/A data stored in advance in the RAM 52 will be directly varied and put out. (The variation amount will depend on the relation with the time shown in FIG. 17).

(2) K1 obtained by reversely calculating the value of K1 in the formula (3) from the D/A data varied in (1) above will be stored in the RAM 52. When this value of K1 is used in all the operations thereafter, the stop diameter will be determined wile maintaining a corrected ratio at the time of switching the objective and switching the light path.

At this time, K1 will be determined as follows. If the data of the stop diameter (in external contact with the visual field) of the field stop 79 when K1=1 is FULLFS (bits), $$FULLFS = \frac{FNo.}{\text{objective magnification} \times FS \text{ projection magnification}} \times 7.5$$

If the variation of the coefficient K1 when the D/A data are varied by one bit is ΔK1, $$\Delta K1 = 1/FULLFS$$

Therefore, the coefficient K1 of when the D/A data are varied by n bits will be given by the following formula:

$$K1 = K1 + (\Delta K1 \times n)$$

where n is recognized by the CPU 51 as a plus or minus value by the selection of "open" or "close" of the switch button 92 on the operating panel 86. Thus, the correction and the maintenance of the ratio by the manual operation of the field stop 79 will be able to be made.

Then, the correction sequence by the manual operation of the aperture stop 77 is exactly the same as in the case of the field stop 79. How to determine the correction coefficient at this time is fundamentally the same. If the controlling rate of the stop diameter of the aperture stop 77 is 0.1 mm/step and the relation between the D/A data and stop diameter is $$D/A \text{ data} = \text{Stop diameter of aperture stop} \times 10,$$

from the formula (2)

$$D/A \text{ data} = NA \times 2 \times f \times K2 \times 10 \qquad (8)$$

The correction coefficient by the manual operation will be determined as follows in the same manner as in the field stop. When the switch button 93 is pushed;

(1) The D/A data stored in advance in the RAM 52 will be directly varied and put out. (The variation amount will depend on the same relation with the time as is shown in FIG. 17.)

(2) K2 obtained by reversely calculating the value of K2 in the formula (8) from the D/A data varied in (1) above will be stored in the RAM 52. When this value of K2 is used in all the operations thereafter, the stop diameter will be determined while maintaining a corrected ratio at the time of switching the objective and switching the light path. At this time, K2 will be obtained as follows. If the data of the stop diameter (100% on the pupil diameter) of the aperture stop 77 when K2=1 is FULLAS (bits), $$FULLAS = NA \times 2 \times f \times 10 \qquad (9)$$

If the variation of the coefficient K2 when the D/A data are varied by one bit, $$\Delta K2 = 1/FALLAS$$

Therefore, the coefficient K2 of when the D/A data are varied by n bits will be given by the following formula:

$$K2 = K2 + (\Delta K2 \times n) \qquad (10)$$

where n is recognized by the CPU 51 as a plus or minus value by the selection of "open" or "close" of the switch button 93 on the operation panel 86. Here the manual operation of the aperture stop 77 shall be explained with an embodiment.

(1) In case the data are set with the objective SPLAN 4, NA=0.13 and f=61.5 will be read out of the table in FIG. 6 and $$FULLAS = 0.13 \times 2 \times 61.5 \times 10 = 159.9 \text{ (bits)}$$

will be made from the formula (9). If the initial value K2=0.8 is put into the formula (8), $$D/A \text{ data} = 159.9 \times 0.8 \approx 128 \text{ (bits)}$$

will be obtained, will be put out to the D/A converter 110 and will be stored in the RAM 52. By the way, at this time, the stop diameter of the aperture stop 77 will be set to be 12.8 mm.

(2) When the aperture stop is stopped down by 5 steps from this state with the switch button 93 by the manual operation, the above mentioned D/A data will be read out of the RAM 52, the operation of $$D/A \text{ data} = 128 - 5 = 123 \text{ (bits)}$$

will be made, these corrected D/A data will be put out to the D/A converter 110 and the stop diameter of the aperture stop will be set at 12.3 mm. Further, the coefficient K2 at this time will be calculated to be $$K2 = 0.8 - \frac{5}{159.9} \approx 0.77$$

from the formula (10) and will be stored in the RAM 52.

(3) Next, when the objective is switched over by the revolver 71 to insert the objective SPLAN APO of 40x into the light path, NA=0.95 and f=6.5 will be read out of the table in FIG. 6 and K2=0.77 will be read out of the RAM 52. Therefore, $$D/A \text{ data} = 0.95 \times 6.5 \times 0.77 \times 10 \approx 95 \text{ (bits)}$$

will be obtained from the formula (8), will be put out to the D/A converter 110 and, at the same time, will be stored in the RAM 52. Thus, the stop diameter of the aperture stop 77 will be set to be 9.5 mm.

Further, the correction by the manual operation of the ND-filter for adjusting the light shall be explained. Therein, the signal is put into the CPU 51 by the switch button 94 on the operation panel 86 and, in the same manner, the ND-filter will be switched over by the ND-filter switching driving device 80. In this case, the correction coefficient by the manual operation will be determined by varying the constant (−30) in the formula (6) as follows:

(1) In the case of brightening: $(-30) + 4 \times n$;
(2) In the case of darkening: $(-30) - 4 \times n$;

where n corresponds to the step number of the light amount ratio in FIG. 10.

As in the above, the field stop, the aperture stop and the light adjustment by the ND-filter will be optionally corrected by the manual operation. Once they are corrected, the correction coefficients then will be stored. Therefore, even if the objective is later switched, the same correction ratio will be able to be always maintained. By the way, the correction coeffcents will be able to be reset at the initial values preferrably by proper means.

Now, examples of the operation sequence at the time of putting in the electric source and the operation sequence at the time of operating the revolver, that is, at the time of switching over the magnification of the objective shall be explained in the following.

Figure 18:
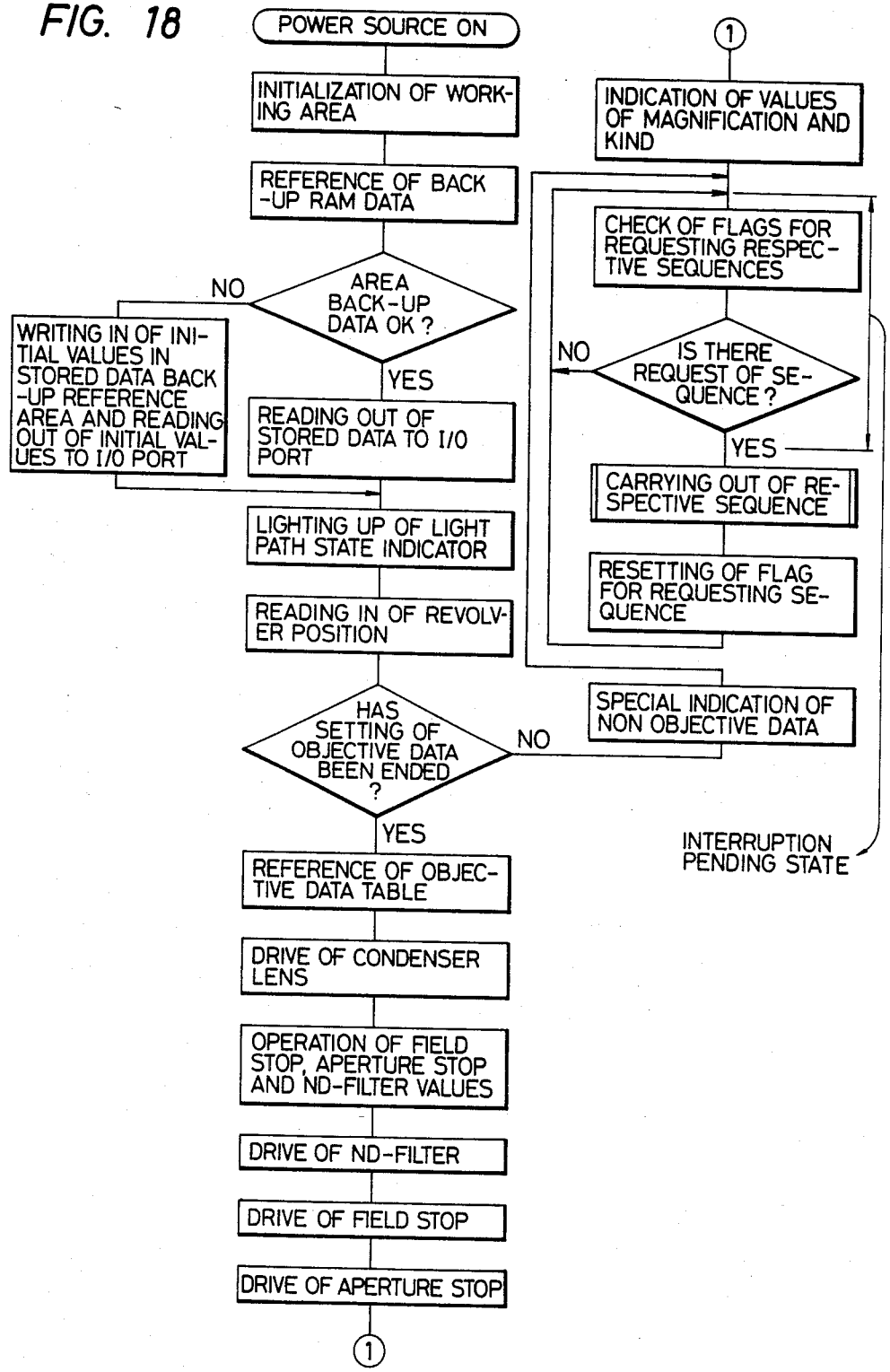
FIG. 18 is a flow chart showing a series of operation sequences at the time of putting in an electric source.
Figure 19:
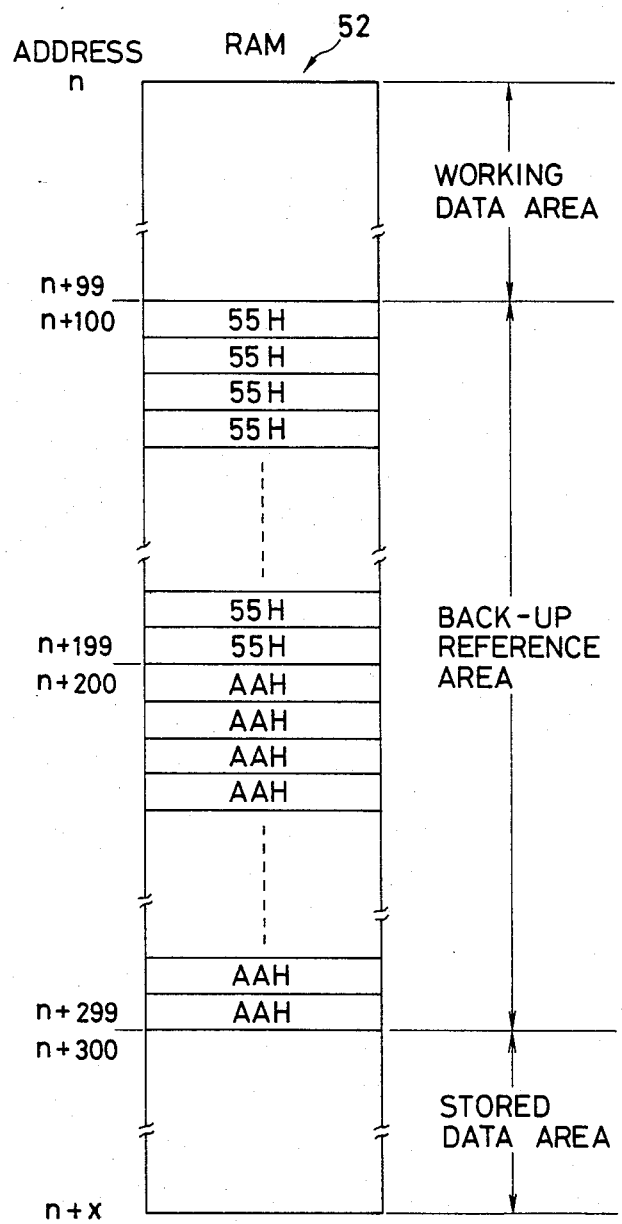
FIG. 19 is an explanatory view showing an example of data areas of a RAM.

First, referring to FIGS. 3 and 18, when an electric source switch not illustrated is put in, the controlling device 50 will be initialized and, by the CPU 51, a program will be fetched from the ROM 54 and such sequence as is mentioned below will be carried out. That is to say, the contents of the working area of the RAM 52 will be first initialized and then whether the contents of the RAM 52 are being backed up by the battery 53 or not when the electric source is interrupted will be checked. In checking the back up data, such data rows written in some specific area of the RAM 52 as are shown in FIG. 19 will be checked in turn, their values will be compared respectively with predetermined data values and whether they are all equal to one another will be judged. In FIG. 19, the ROM 52 in which each of data is formed of 8 bits is shown and the addresses are from n to n+x. In this case, the addresses from n to n+99 are of a working data area to be used for the sequence control of the controlling device 50, the addresses from n+100 to n+299 are of a back-up reference area to be used to check the back-up data and further the addresses from n+300 to n+x are of a preserved data area. Here, when all of the data of the addresses from n+100 to n+199 are respectively 55H (where H represents a HEXA DECIMAL) and the data of the addresses from n+200 to n+299 are all AAH, the data to be preserved will be handled as backed up. If even 1 bit of the data of the back-up reference area of the addresses from n+100 to n+199 is different from 55H or AAH, the preserved data will be judged to be also incorrect and will be initialized and the data of the back-up reference area will be also correctly written in to be all respectively 55H and AAH. There are such reserved data as, for example, the data of the magnifications and kinds of the objectives, statuses on the sequence control of the respective optical system elements and correction coefficients A' and B' for automatic focusing shown in FIG. 15. Thereafter, the data will be put out to the I/O port 60 to initialize the driving systems for the respective optical system elements.

Then, by the CPU 51, the present position of the revolver will be detected by the objective switching driving device 70, the condenser lens to be inserted into the light path will be determined from the revolver position with reference to the table 100 in FIG. 5 and the table in FIG. 6, switching data will be put out to the condenser lens switching driving device 74, further the stop diameters of the field stop 79 and aperture stop 77 will be determined to set the observing conditions, the value of ND-filter 81 will be determined to set the optimum brightness and the field stop 79, aperture stop 77 and ND-filter 81 will be adjusted to be respectively of the determined values.

The methods of calculating the respective values and driving method are the same as in the case of setting the data of the objective described above. Here, when the back-up data of the RAM 52 have vanished and the data on the objective have not been set, naturally a series of these operations will not be made. After the above operations, the CPU 51 will wait for the input by the switch button on the operating panel 86 (FIG. 4), that is to say, will wait for the interruption shown in the flow chart in FIG. 18.

Figure 20:
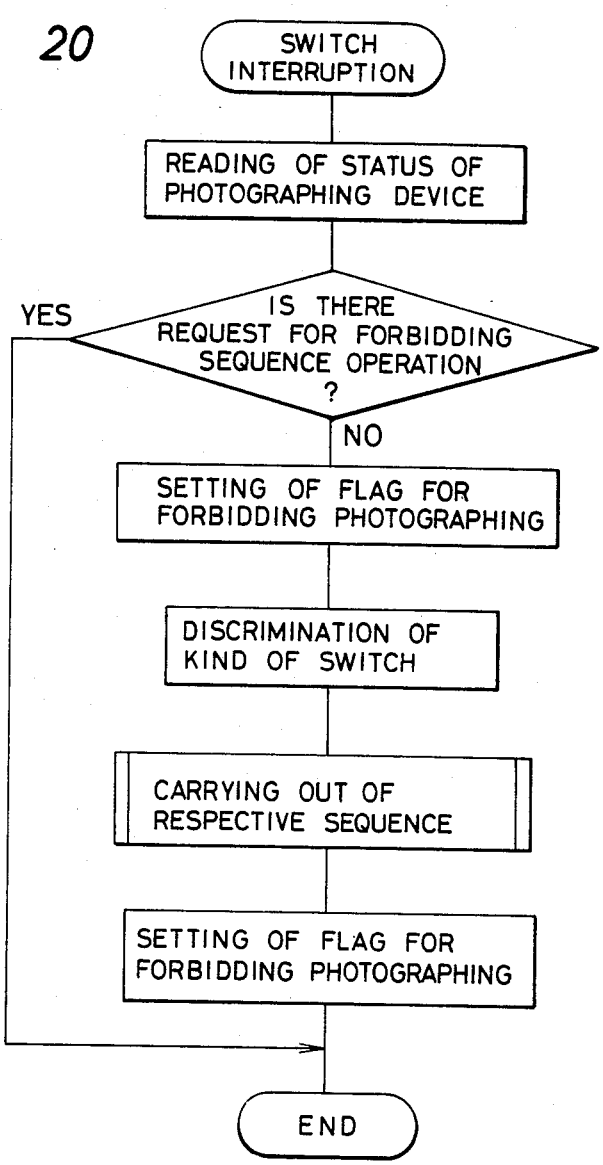
FIG. 20 is a flow chart showing an operation sequence at the time of a switch interruption.

Now, an embodiment of the sequence of when the revolver starting switch button 98 on the operating panel 86 is switched on shall be explained with reference to FIG. 20. When the revolver starting switch button 98 is pushed, a switch interrupt signal will be given to the CPU 51 through the interface 65. The status as to whether the photographing device 59 is in the READY state or not will be first put into the CPU 51 through the interface 58. The READY state of the photographing device 59 means a state that the photographing device 59 is not photographing (the shutter is not opened). That is to say, if the photographing device 59 is photographing, the CPU 51 will neglect the sequence of the switch input. On the contrary, when it is to carry out the sequence, the CPU 51 will prohibit the photographing device 59 from releasing the shutter and, after a series of sequences are carried out, the prohibition will be released. This means to positively prevent such so-called photographing mistakes as driving the respective optical system elements by mis-operations at the time of photoghaphing and photographing while the optical system is being driven.

Figure 21:
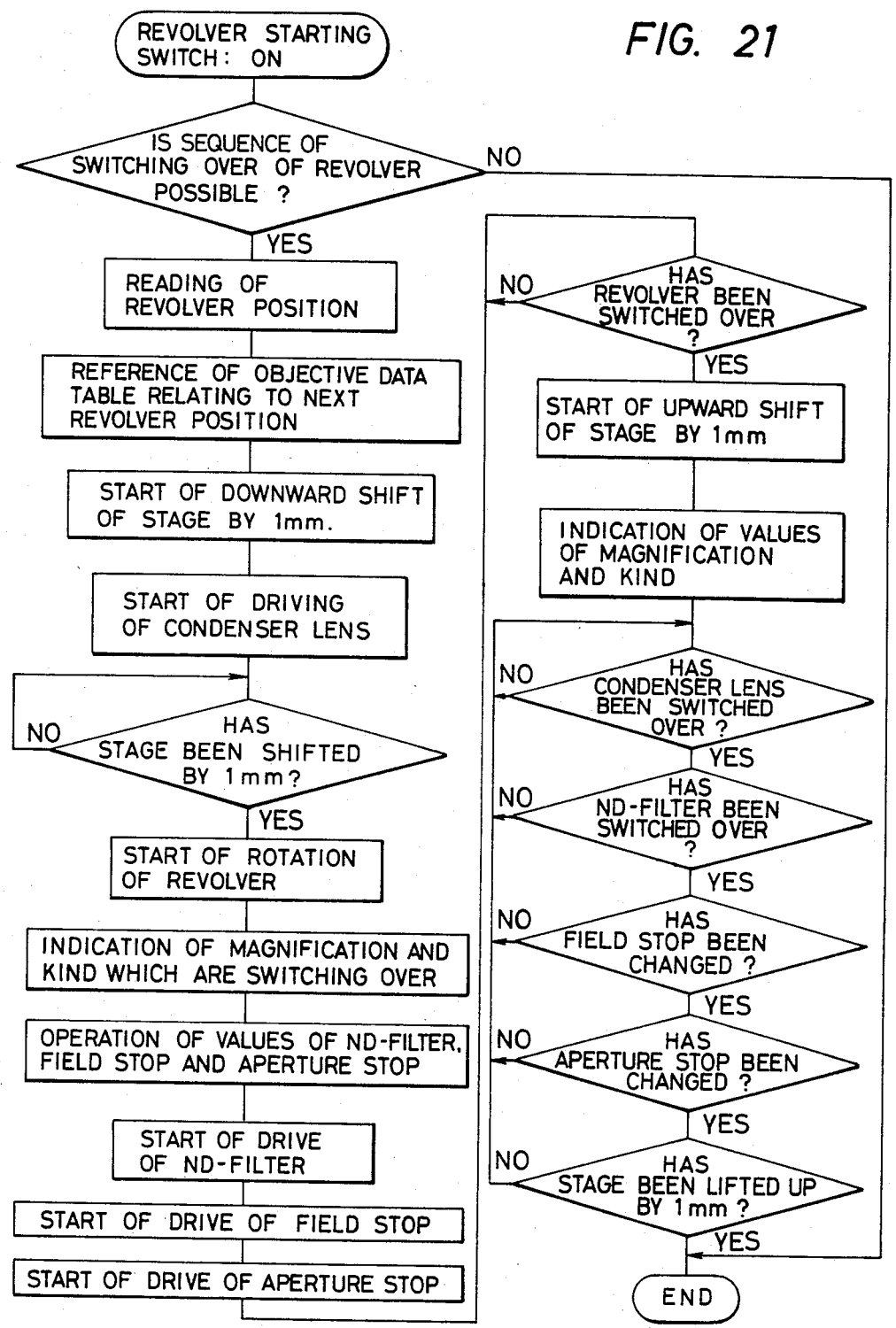

FIG. 21 is a flow chart showing sequences at the time of switching over the revolver. This example shows the case that the data of the objective are set in advance for all the revolver positions. First the present revolver position will be put into the CPU 51 and then the position to be switched to will be known to refer to the data table 100. (This means that the driving control of the later series of optical system elements is possible even before the revolver is switched over.) Then the stage 73 will be lowered by 1 mm so as not to damage the sample when the objective is moved by the rotation of the revolver and the drive for switching the condenser lens will be started. When the stage 73 has thus lowered by 1 mm, the objective switching driving device 70 will start to rotate the revolver 71. At the same time, the drive for adjusting the ND-filter 81, field stop 79 and aperture stop 77 will be started. If these operations are made when the revolver is stationary, the process of varying the brightness and image appearance will be seen by the observer who will thus feel unpleasant. In order to prevent it, the series of these operations will be completed when the revolver has been changed over. When the revolver 71 ends the rotation and reaches the next position, the stage 73 will move up by 1 mm to return to the former position. If, for example, a stepping motor or the like is utilized to control the stage 73, the reproductivity of the control of the position of the stage will be positive.

Figure 22:
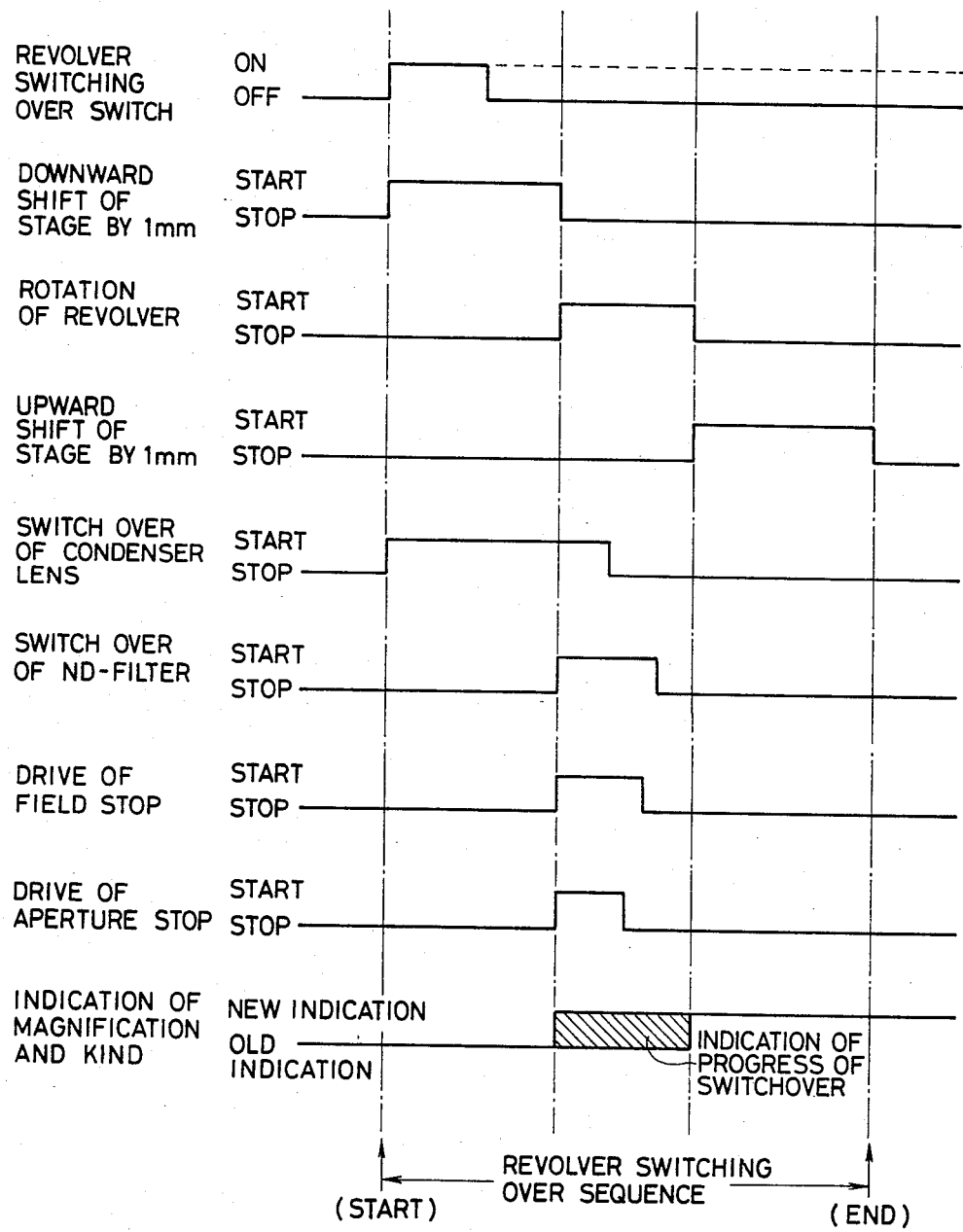
FIG. 22 is a chart showing operating time orders of the respective driving devices when a revolver switching over switch is operated.

FIG. 22 shows a time chart of a series of sequences in the case of rotating the revolver. Here, the condenser lens switching operation starts as soon as the stage moves down by 1 mm, because the time required to switch over the condenser lens is longest in this embodiment. When this system is adopted, substantially no trouble will be caused at the time of actual observation.

We claim:

1. A microscope comprising a revolver having thereon a plurality of objectives, an objective data input means for putting in magnifications and kinds of said objectives, a first memory means functionally connected to said objective data input means and capable of storing data of said plurality of objectives put in by said input means along with position data of said revolver, a central processing unit functionally connected to said first memory means, a first detecting means functionally connected to said central processing unit and capable of recognizing the objective inserted in a light path through said revolver, a plurality of first driving means functionally connected to said central processing unit and capable of respectively driving a light adjusting device, field stop, aperture stop and condenser lens unit, and a second memory means functionally connected to said central processing unit and capable of storing data for making an illumination system suitable for the objective inserted in the light path; the data relating to the objective inserted in the light path and the data to make the illumination system suitable for the objective inserted in the light path being read out of said first and second memory means by an output signal from said first detecting means; and a brightness of illuminating light to be adjusted by said light adjusting device, a field stop diameter, an aperture stop diameter and a condenser lens to be inserted into the light path being automatically set through said central processing unit and first driving means on the basis of the data thus read out so as to be optimum for the objective inserted in the light path.

2. A microscope comprising a revolver having thereon a plurality of objectives, an objective data input means for putting in magnifications and kinds of said objectives, a first memory means functionally connected to said objective data input means and capable of storing data of said plurality of objectives put in by said input means along with position data of said revolver, a central processing unit functionally connected to said first memory means, a first detecting means functionally connected to said central processing unit and capable of recognizing the objective inserted in a light path through said revolver, a plurality of first driving means functionally connected to said central processing unit and capable of respectively driving a light adjusting device, field stop, aperture stop and condenser lens unit, and a second memory means functionally connected to said central processing unit and capable of storing data for making an illumination system suitable for the objective inserted in the light path; the data relating to the objective inserted in the light path and the data to make the illumination system suitable for the objective inserted in the light path being read out of said first and second memory means by an output signal from said first detecting means; and a brightness of illuminating light to be adjusted by said light adjusting device, a field stop diameter, an aperture stop diameter and a condenser lens to be inserted into the light path being automatically set through said central processing unit and first driving means on the basis of the data thus read out so as to be optimum for the objective inserted in the light path, and further comprising a photographing light path, a plurality of photographing lenses capable of being inserted selectively in said photographing light path and a second detecting means arranged in association with the observing light path and photographing light path to detect which of the observing light path and photographing light path has been selected to be used, said light adjusting device and field stop being automatically controlled so as to obtain the brightness of illuminating light and field stop diameter optimum to the light path selected to be used through said first memory means, central processing unit and first driving means.

3. A microscope according to claim 1 or 2 further comprising a plurality of switch means connected functionally to said first memory means and capable of respectively manually operating to correct the automatically set illuminating light brightness, field stop diameter and aperture stop diameter, the automatically set illuminating light brightness, field stop diameter and aperture stop diameter being corrected through said central processing unit and first driving means on the basis of correction coefficients stored in said first memory means when said switch means are operated.

4. A microscope according to claim 1 or 2 further comprising a second driving means operatively connected to said revolver and capable of rotating the revolver to switch over the objective to be inserted into the light path, a switch means functionally connected to said second driving means and central processing unit and capable of starting the operation of said second driving means and central processing unit, said first and second driving means being related to each other through said central processing unit so as to complete the automatic setting of the brightness of illuminating light, field stop diameter, aperture stop diameter and condenser lens while the objective is being switched by the operation of said switch means.

5. A microscope according to claim 1 or 2 wherein, when the data of the objectives are to be put into said first memory means by said input means, the brightness of the illuminating light, field stop diameter values, aperture stop diameter values and kinds of the condenser lens optimum to the respective objectives are stored in said first memory means, and the brightness of illuminating light, field stop diameter and aperture stop diameter are automatically set respectively at initial values and a standard condenser lens is automatically inserted into the light path.

6. A microscope according to claim 3 wherein said field stop and aperture stop are controlled with an exponential change in respect of time when said field stop and aperture stop are to be manually operated.

* * * * *